(12) United States Patent
Guan

(10) Patent No.: US 7,818,732 B2
(45) Date of Patent: Oct. 19, 2010

(54) TRANSFER SYNTAX NOTATIONAL SYSTEM AND METHOD

(75) Inventor: Zaijin Guan, San Diego, CA (US)

(73) Assignee: Protomatics, Inc., San Diego, CA (US)

( * ) Notice: Subject to any disclaimer, the term of this patent is extended or adjusted under 35 U.S.C. 154(b) by 1199 days.

(21) Appl. No.: 11/430,691

(22) Filed: May 8, 2006

(65) Prior Publication Data
US 2007/0260740 A1    Nov. 8, 2007

(51) Int. Cl.
G06F 9/45    (2006.01)
G06F 9/44    (2006.01)
G06F 15/16    (2006.01)

(52) U.S. Cl. .................. 717/143; 717/106; 717/137; 709/230

(58) Field of Classification Search .......... 717/106, 717/137, 143; 709/230
See application file for complete search history.

(56) References Cited

U.S. PATENT DOCUMENTS

| | | | | |
|---|---|---|---|---|
| 5,687,378 | A * | 11/1997 | Mulchandani et al. | 717/131 |
| 5,862,383 | A * | 1/1999 | Laitinen | 717/109 |
| 6,286,035 | B1 * | 9/2001 | Gillis et al. | 709/206 |
| 6,549,943 | B1 * | 4/2003 | Spring | 709/223 |
| 6,834,382 | B2 * | 12/2004 | Marso et al. | 717/143 |
| 7,263,691 | B2 * | 8/2007 | Vehkomaki | 717/140 |
| 7,739,696 | B2 * | 6/2010 | Wolfe et al. | 719/328 |
| 2005/0005261 | A1 * | 1/2005 | Severin | 717/108 |
| 2005/0181787 | A1 * | 8/2005 | Judd et al. | 455/431 |
| 2005/0273772 | A1 * | 12/2005 | Matsakis et al. | 717/136 |
| 2007/0044069 | A1 * | 2/2007 | Doucette et al. | 717/106 |

OTHER PUBLICATIONS

Neufeld et al. (The Design and Implementation of an ASN. 1-C Compiler, IEEE Transactions on Software Engineering. vol. 16. No. 10. Oct. 1990).*
Sample et al. (SNACC 1.0: A high performance ASN.1 to C/C++ compiler, Univ. British Columbia, Canada, Tech. Rep., 1993).*
Protomatics (TSN.1 Compiler Tutorial, Feb. 17, 2006, URL:http://web.archive.org/web/20060217172402/protomatics.com/tsnc_tutorial.html).*
Tantiprasut et al. (ASN.1 protocol specification for use with arbitrary encoding schemes, IEEE/ACM Transactions on Networking (TON), vol. 5 , Issue 4, Aug. 1997).*

* cited by examiner

Primary Examiner—Lewis A Bullock, Jr.
Assistant Examiner—Hang Pan
(74) Attorney, Agent, or Firm—Procopio, Cory, Hargreaves & Savitch LLP

(57) ABSTRACT

The system and method for defining messages of communication networks in a formal notation called Transfer Syntax Notation One ("TSN.1") and compiling TSN.1 message definitions into a software message parser using a TSN.1 compiler are provided. The parser is designed to speed up the development of wireless communication software. It translates messages between the implementation specific, programming language and platform dependent representations and the standard defined, programming language and platform independent representations. The messages described using the TSN.1 notation can be communicated to wireless device protocol stacks over a variety of networks, which utilize a number of protocols and implement OSI 7 Layers Protocol Model, including such layers as Transport, Network, and Data Link. The message parser generated by the TSN.1 Compiler can be easily incorporated into a user application, and can run on many popular software development platforms, such as Microsoft Windows, Linux, SUN Solaris, and other Unix systems.

30 Claims, 9 Drawing Sheets

TRANSFER SYNTAX NOTATIONAL SYSTEM AND METHOD

BACKGROUND

1. Field of the Invention

The present invention relates generally to the field of software compilers, and more particularly relates to a software compiler for translating message definitions defined using Transfer Syntax Notation One ("TSN.1") message syntax into source code encompassing message management functions.

2. Related Art

Communication networks require software for performing tasks such as creating, encoding, decoding, and destroying messages, to name a few. Conventional methods for developing message management software typically involve designing and implementing code in a high level language such as C and/or C++. Many system-level constraints may be imposed in order to maximize the amount of information a message may carry while simultaneously minimizing the size of message. This kind of optimization is especially important for message transport over low-bandwidth communication channels such as cellular telephones.

Protocols for cellular communications are well-defined and embody an optimized trade-off between message content and message size. Typically, bit-level design and programming are required to realize message management software conforming to the requirements of these protocols. This is demanding in terms of design, requiring much attention to bit field allocation and de-allocation, for example. Message formatting specifications may become quite complicated as well, requiring specified field sizes and nested messages, for example. This is further complicated by design constraints imposed by a target transport protocol, and even more so by the typical need to design to multiple target protocols used around the world. Moreover, as new applications are developed for use on communications devices such as cellular telephones, new message types are often required to encapsulate new data types needed to implement the applications. Ultimately, substantial effort must be expended to develop message management software accommodating new message types while also conforming to low-level design demands of the protocols of target networks. Tasks including design, hand-typing code, debugging, and maintenance are costly and resource-intensive in terms of time and personnel.

There is therefore a need for systems and methods to overcome the significant demands of designing and programming low-level message management software conforming to the protocols of typically low-bandwidth communication systems, thus enabling greater development efficiency and conservation of valuable resources and time.

SUMMARY

Embodiments of the present invention provide systems and methods for creating message definitions in a Transfer Syntax Notation One ("TSN.1") and generating source code implementing fundamental message management functions tailored to the message definitions. The source code may be generated in any programming language. Embodiments of the present invention further provide for a runtime library with which the generated code may be compiled according to the language in which the code is instantiated. Other embodiments provide for static ("compile-time") and dynamic ("runtime") linking with the runtime library.

In one embodiment, a developer creates a file containing at least one message definition defined in a TSN.1 syntax. The file is compiled using a TSN.1 compiler which generates source code in the C programming language, the source code implementing message management functions such as encoding, decoding, scanning and printing and others.

In one embodiment, the TSN.1 compiler generates source code encompassing elements of a message parser including, for example, a message encoder and decoder. Source code generated according to embodiments of the present invention can be easily incorporated into user applications, saving substantial amounts of time and resources over conventional methods.

The TSN.1 compiler is highly portable and can run on many popular software development platforms, including Microsoft Windows, Linux, SUN Solaris, and other Unix systems. In addition, the TSN.1 compiler can run on both 32-bit and 64-bit processors and supports a number of user-specific software compilation options. Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Embodiments of the present invention provide systems and methods for compiling a message defined in a format referred to herein as Transfer Syntax Notation One ("TSN.1") to generate source code implementing fundamental message management functions tailored to the message. The source code may be generated in various programming languages. Embodiments of the present invention further provide for a runtime library with which the generated code may be compiled according to the language in which the code is instantiated. Other embodiments provide for static ("compile-time") and dynamic ("run-time") linking with the runtime library.

After reading this description, it will become apparent to one skilled in the art how to implement the invention in various alternative embodiments and alternative applications. However, although various embodiments of the present invention will be described herein, it is understood that these embodiments are presented by way of example only and not limitation. As such, this detailed description of various alternative embodiments should not be construed to limit the scope or breadth of the present invention as set forth in the appended claims.

Figure 1:
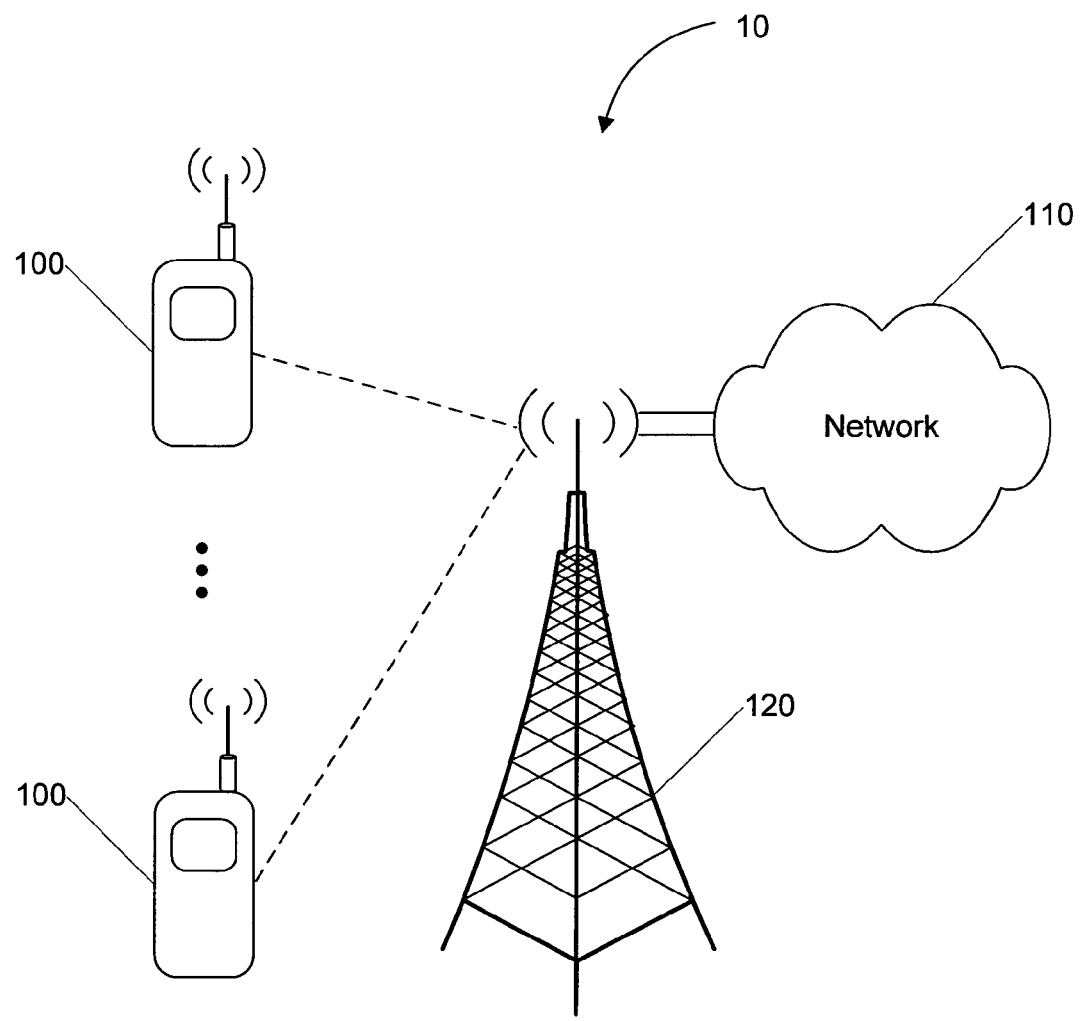
FIG. 1 is a high level network illustrating an example wireless system.

FIG. 1 is a high-level network diagram illustrating an example wireless system 10. The system 10 comprises at least one wireless device 100, at least one access point or base station 120 and at least one network 110. Examples of the wireless device 100 include a cellular telephone and a portable computer with wireless connectivity.

The wireless device 100 and the base station 120 communicate by sending packets of information back and forth. Communications between the wireless device and the base station can be governed by one or more protocols or standards such as CDMA 2000 1x, CDMA 2000 1xEV-DO, GSM, IEEE 802.11/WiFi, IEEE 802.16/WiMAX, Bluetooth, and TCP/IP. Each of those protocols defines communication managing messages and the format for the messages. Messages are used by the base station and the wireless device to manage the communication between them. For example, types of messages can include those for registering with network, establishing a communication link, requesting bandwidth, performing handover and many other functions.

Figure 2:
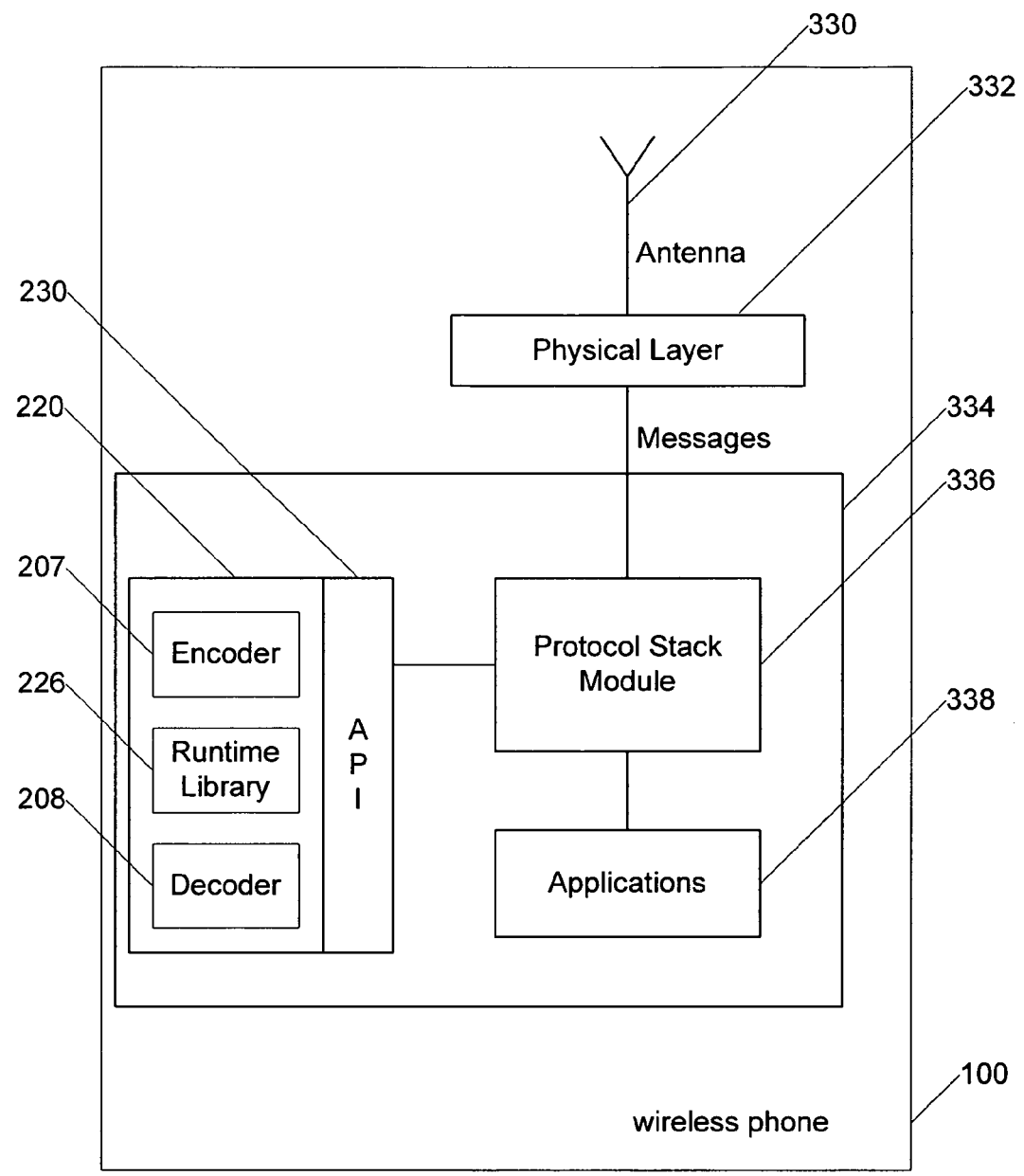
FIG. 2 is a functional block diagram of a wireless device according to an embodiment of the present invention.

FIG. 2 is a block diagram illustrating the wireless device 100 according to an embodiment of the present invention. In the illustrated embodiment, the wireless device 100 comprises an antenna 330, a physical layer module 332, and other higher level layer generally indicated by block 334. The physical layer module 332 is configured to send a stream of bits over the antenna 330 to the wireless network and to receive a stream of bits from the wireless network through the antenna 330. The other higher level layers of interest include the message parser 220, the application program interface (API) 230 for the message parser 220 which have been generated according to embodiments of the present invention. The message parser 220 comprises an encoder 207 for encoding user messages for transmission over the network, a decoder 208 for decoding messages received from the network, and a runtime library 226, which provides functions shared by the encoder and the decoder.

The higher level layers also include the protocol stack module 336 and applications 338. The protocol stack module 336 utilizes the functions of the message parser 220, via the API 230, to encode messages for transmission and to decode incoming messages.

Figure 3:
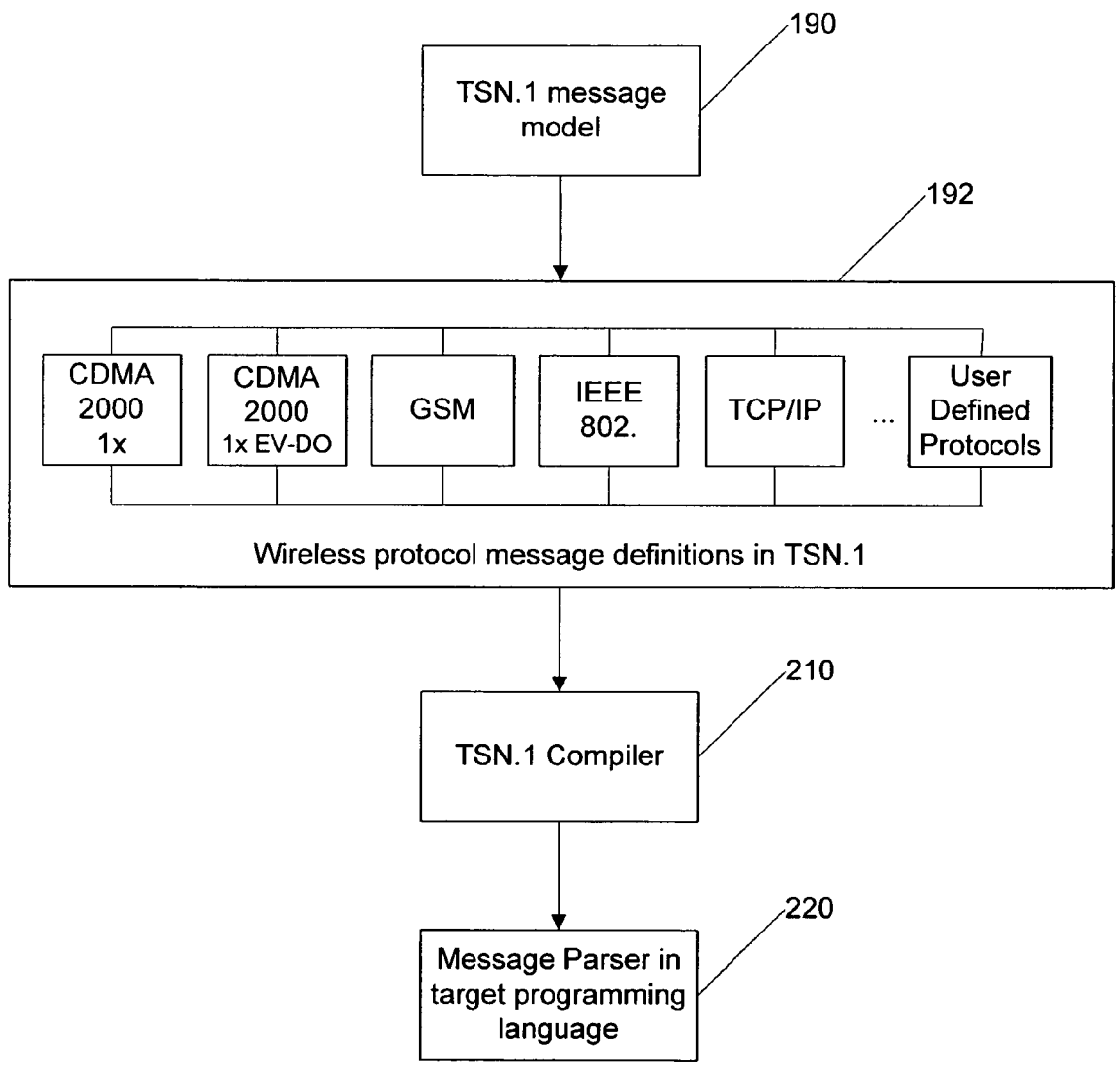
FIG. 3 is a high-level block diagram illustrating a TSN.1 message model, various wireless protocol message definitions in TSN.1, a TSN.1 compiler and a TSN.1 message parser according to an embodiment of the present invention.

FIG. 3 is a high-level block diagram illustrating a TSN.1 message model 190, various wireless protocol message definitions in TSN.1 192, a TSN.1 compiler 210 and a TSN.1 message parser 220 according to an embodiment of the present invention. In the illustrated embodiment, the TSN.1 message model 190 comprises modules that allow a user to describe communication managing messages to be sent to or received from a network. The TSN.1 notation is protocol-independent notation, which means that in describing communication managing messages using TSN.1 notation, the user is not constrained by the requirements imposed by communication protocols. To facilitate the describing of the messages, the TSN.1 message model 190 comprises a message definitions module, a constants module and an enumerations module. In one embodiment, the message definitions comprise field declarations.

Messages expressed in the TSN.1 message model 190 can be communicated using any of a variety of communication protocols. For example, the messages can be sent over the network using CDMA 2000 protocol (e.g. CDMA 2000 1x, CDMA 2000 1x EV-DO, etc.), GSM protocol, IEEE 802 protocol, TCP/IP, etc. Alternatively, a user can define a communication protocol and use that protocol to communicate the messages over a network. The network can be a wireless network or a conventional wired network. The messages are saved in a communication managing message source file and sent to the TSN.1 compiler 210.

The TSN.1 compiler 210 is a protocol-independent notation compiler because from the user perspective, as an input, the compiler takes messages expressed in the protocol-independent notation TSN.1. After accepting the user input, the TSN.1 compiler 210 links the input with protocol dependent message definitions 192, and then generates a message parser in a target programming language 220. Examples of target programming languages include, but are not limited to, a C programming language and C++ programming language.

Figure 4:
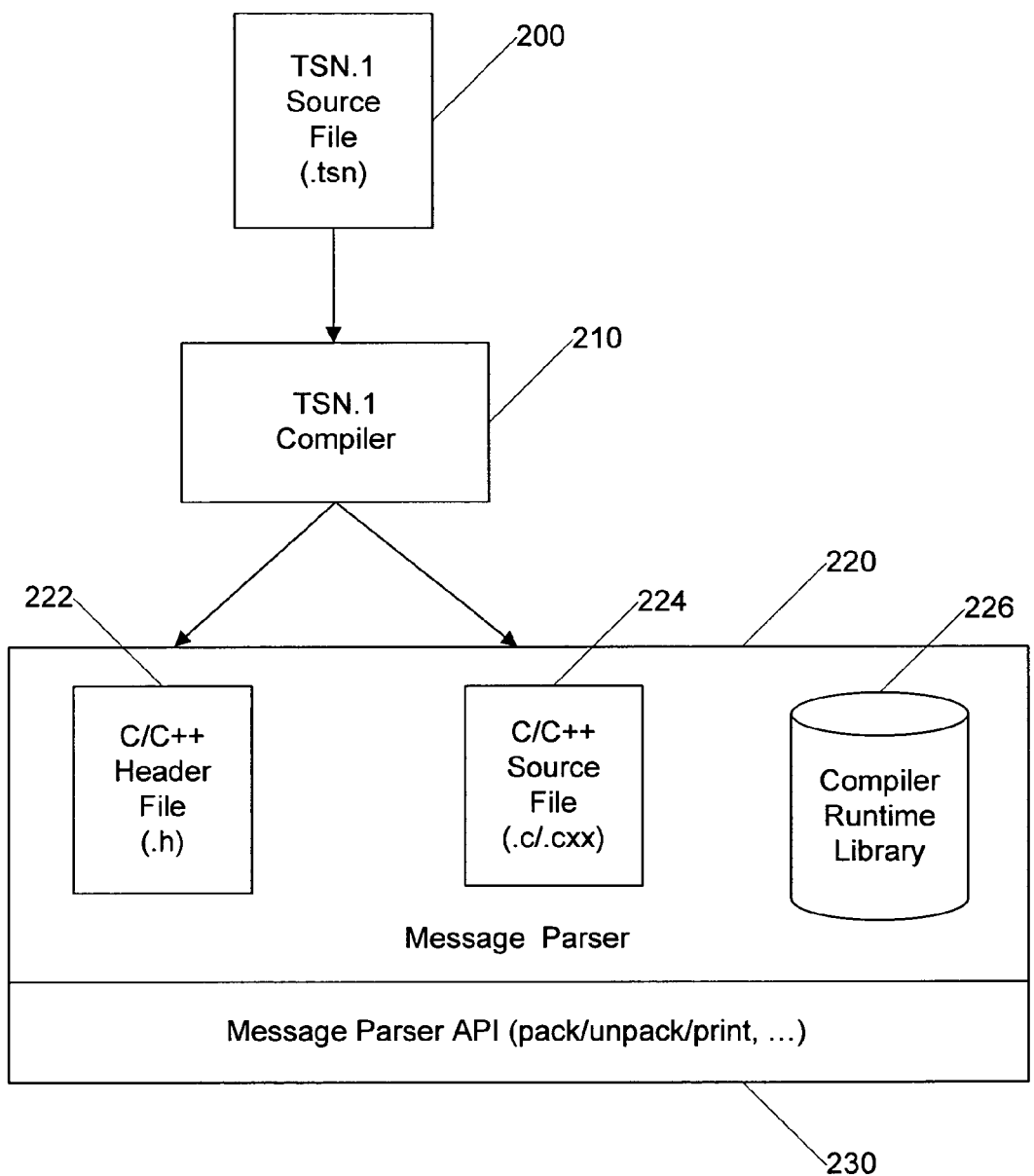
FIG. 4 is a high-level block diagram illustrating a TSN.1 compiler and a TSN.1 message parser according to an embodiment of the present invention.

FIG. 4 is a high-level block diagram illustrating a TSN.1 compiler 210 and the output of the compiler in the form of a message parser 220 according to an embodiment of the present invention. In the illustrated embodiment, the TSN.1 compiler 210 compiles a TSN.1 source file 200. The TSN.1 source file 200 comprises communication managing messages defined by a user.

In one embodiment, the TSN.1 notation is a notation used to represent messages exchanged within a variety of communication networks, including wireless communication systems. The TSN.1 notation incorporates a formalized description of messages which can be applied to a variety of protocols.

The TSN.1 format provides not only for a convenient way to describe data communicated over the network, but also overcomes some of the shortcomings of other conventional notations, such as XML and ASN.1. XML is a meta-language and therefore, it can be used to describe almost any type of messages. XML's strength is also its weakness. Due to its generality, XML lacks support to domain specific language constructs. Using XML to describe messages often results in an inept and difficult-to-understand syntax.

Another widely used message description notation is ASN.1. ASN.1, however, is limited by a fixed set of encoding rules. As a result, it is very difficult to apply ASN.1 to messages that were not originally specified in ASN.1. Furthermore, certain encoding constructs such as conditionals and recursions, which are widely used in a number of wireless communication standards, are impossible to express in ASN.1.

In one embodiment, the TSN.1 notation is suitable for a bandwidth constrained system primarily because it has an easy-to-understand syntax and provides support to domain specific language constructs. In addition, the TSN.1 notation is suitable for lower layer protocols such as Network, Transport, Data Link of the OSI 7 Layers Protocol Model, and is designed to define a message in terms of actual bit sequence transmitted over the air or over the wire. It requires no separate coding, and requires no separate encoding rules. The TSN.1 format will further be described in FIGS. 6-8.

The TSN.1 source file 200 comprises a message definitions module, a constants module and an enumerations module. In one embodiment, the message definitions comprise field declarations.

In one embodiment, the TSN.1 compiler 210 can be invoked either from a command prompt or through a Compiler Control Panel Graphics User Interface ("GUI"). The TSN.1 compiler 210 accepts a variety of parameters to specify, for example, target programming language, optimization level, debugging options, etc. The parameters can be entered from a command line or through the GUI.

In one embodiment, a software developer may simply type the message definition into the TSN.1 source file 200 using a regular text editor. Then, the developer may run the TSN.1 compiler 210 with the TSN.1 source file 200 as an input.

In one embodiment, the TSN.1 compiler 210 is a tool for the automatic generation of a code for handling network communication messages. Because the code containing message handling subroutines is created automatically, the code has a consistent interface and implementation. In addition, the subroutines code can be easily extended, supported and maintained.

In one embodiment, the TSN.1 compiler 210 generates the message parser 220, which comprises an encoder and a decoder. The encoder takes messages expressed in a user format and encodes them to messages that can be transmitted in a predefined format over a network. The decoder performs functions opposite to the encoder's functions, namely, it takes messages received from the network and decodes them to messages expressed in the user format.

In one embodiment, the TSN.1 compiler 210 is a code generator for the message parser 220. The message parser 200 comprises a C/C++ header file 222, a C/C++ source file 224 and the runtime library 226. The C/C++ header file (.h) 222 contains C structure typedefs (classes for C++) for each TSN.1 message definition. The C/C++ source file (.c/.cxx) 224 contains message descriptors for each TSN.1 message definition. The C/C++ header file 222 and the C/C++ source file 224 can be easily incorporated into a user source code and then compiled to generate a user executable code. The object file of the runtime library 226 comprises an executable code for message handling subroutines that can be linked with other executable modules to produce a resulting executable code.

In one embodiment, the header file 222 (".h" suffix) may contain function prototypes as well as constant, enumeration, and data structure definitions for the constants, enumerations, and messages defined in the TSN.1 file. Constants in TSN.1 are generated as #define's. For example, the constant definition N_ADMPDefault::=0;

is translated to
define N_ADMPDefault 0

Enumerations in TSN.1 are translated to typedef'ed enums. For example, the enumeration definition

```
is856_admp_AirMessageId ::= enumerated
{
    IS856_ADMP_UATI_REQUEST,
    IS856_ADMP_UATI_ASSIGNMENT,
    IS856_ADMP_UATI_COMPLETE,
    IS856_ADMP_HARDWARE_ID_REQUEST,
    IS856_ADMP_HARDWARE_ID_RESPONSE,
    IS856_ADMP_CONFIGURATION_REQUEST (0x50),
    IS856_ADMP_CONFIGURATION_RESPONSE
}
``` is translated to
```
typedef enum
{
    IS856_ADMP_UATI_REQUEST = 0,
    IS856_ADMP_UATI_ASSIGNMENT = 1,
    IS856_ADMP_UATI_COMPLETE = 2,
    IS856_ADMP_HARDWARE_ID_REQUEST = 3,
    IS856_ADMP_HARDWARE_ID_RESPONSE = 4,
    IS856_ADMP_CONFIGURATION_REQUEST = 80,
    IS856_ADMP_CONFIGURATION_RESPONSE = 81
} is856_admp_AirMessageId;
```

Messages in TSN.1 are compiled to typedef'ed structures in C or classes in C++. For example, the message definition

```
is856_admp_UATIComplete( ) ::=
{
    ...
}
``` is translated in C to

```
typedef struct
{
    ...
} is856_admp_UATIComplete;
``` and in C++ to

```
class is856_admp_UATIComplete : public tsncxx_Message
{
    ...
};
``` where tsncxx_Message is the base class for all messages. Field declarations in a TSN.1 message body are translated to their corresponding C/C++ data members. TABLE 1 shows the mapping between the TSN.1 message field declarations and C/C++ data members:

TABLE 1

| Field Declaration | C/C++ Data Members | Description |
| --- | --- | --- |
| Bits 8; | uint8 Bits; | Bit field with constant size <= 8 |
| Bits 11; | uint16 Bits; | Bit field with constant size > 8 and <= 16 |
| Bits 30; | uint32 Bits; | Bit field with constant size > 16 and <= 32 |

TABLE 1-continued

| Field Declaration | C/C++ Data Members | Description |
|---|---|---|
| Bits 128; | uint8 Bits[16]; | Bit field with constant size > 32 |
| BitSize 2;<br>Bits BitSize * 8; | uint8 BitSize;<br>uint32 Bits; | Bit field with maximum size <= 32 |
| BitSize 4;<br>Bits BitSize * 8; | uint8 BitSize;<br>uint8 *Bits; | Bit field with maximum size > 32 |
| Message : Type; | Type *Message; | Nested message field |
| Msgs : case Id of<br>{<br>  0 =><br>    Message0 : Type0;<br>  1 =><br>    Message1 : Type1;<br>  2 =><br>    Message2 : Type2;<br>  _=><br>    Unknown : Type3;<br>}; | union<br>{<br>  Type0 *Message0;<br>  Type1 *Message1;<br>  Type2 *Message2;<br>  Type3 *Unknown;<br>} Msgs; | Case of field |
| Bits[6] : 8; | uint8 Bits[6]; | Fixed size array of bit fields |
| ArraySize 8;<br>Bits[ArraySize] 15; | uint8 ArraySize;<br>uint16 Bits[255]; | Maximum size array of bit fields |
| Msgs[ ] :Type; | uint16 __Msgs_size__;<br>Type *Msgs[16]; | Variable size array of message fields. __Msgs_size__ indicates the actual size of the array. |
| Msgs[(0..32)] : Type; | uint16 __Msgs_size__;<br>Type *Msgs[32]; | Variable size array of message fields with a maximum size. __Msgs_size__ indicates the actual size of the array. |
| reserve 7; | None | Reserved field |
| align(8); | None | Alignment field |
| optional Bits 3; | uint8 __Bits_optional__;<br>uint8 Bits; | Optional bit field. __Bits_optional__ indicates if Bits is present. |

In the case of variable size arrays and optional fields, extra data members are generated. These members start and end with a '_' character to avoid possible conflict with other members.

The messages defined in TSN.1 are independent of machine architecture and implementation language. The TSN.1 messages are defined directly in terms of the bits and bytes transmitted. No separate encoding rule is required because it is implied by the definition itself.

In one embodiment, the runtime library 226 needs to be adapted to user specific platform before it can be used. As described above, the platform specific customization is defined in tsnc_custom.h. The runtime library 226 and the generated code can be conditionally compiled using a variety of flags. Examples of flags are listed in the TABLE 2:

TABLE 2

| FLAG NAME | USAGE |
|---|---|
| TSNC_NO_STD_C_LIBRARY | This flag should be defined if user's environment does not support the Standard C Library. |
| TSNC_MSG_CLONE | If defined, this flag will cause the Clone function to be compiled in. |
| TSNC_MSG_EQUAL | If defined, this flag will cause the Equal function to be compiled in. |
| TSNC_MSG_PRINT | If defined, this flag will cause the Print function to be compiled in. |
| TSNC_MSG_SCAN | If defined, this flag will cause the Scan function to be compiled in. |

In one embodiment, the message parser 220 implements a variety of common message operations, such as pack (encode), unpack (decode), print, etc. Access to these operations is provided via a message parser Application Program Interface ("API") 230. The files generated by the TSN.1 compiler and the runtime library provide a complete solution for encoding and decoding TSN.1 messages.

In one embodiment, the TSN.1 notation can be used to define not only over-the-air messages, but also the protocol stack internal messages. Many standards refer to them as primitives. This can really streamline the software development because it makes tracing and debugging of these primitives effortless. For example, to trace on a particular primitive, the pack( ) function is called. The pack( ) function packs the primitive into a buffer and sends the stream of bytes over a trace interface. A user's test tool picks up the stream of bytes from the other end, unpacks and displays it.

In one embodiment, the C/C++ runtime library API 230 provides the interface for user application to perform operations on TSN.1 messages. The operations supported by API 230 are listed in TABLE 4:

TABLE 4

| OPERATIONS | DESCRIPTION |
|---|---|
| Initialize | Initialize a message |
| Finalize | Finalize a message |
| SizeOf | Compute the size of a message in bits |
| Equal | Compare two messages for equality |
| Reference/Unreference | Increment/Decrement the reference count of a message |
| Clone | Make a deep copy of a message |
| Pack | Pack a message into a bit buffer |
| Unpack | Unpack a message from a bit buffer |
| Print | Print a message into a string |
| Scan | Parse a message from a string |

In one embodiment, the runtime library API 230 provides support for the pack( ) function. This operation allows a user to pack a properly populated message structure into a bit buffer. The code below gives an example usage in C:

```
{
    is856_admp_UATIRequest    msg;
    uint8                     buf[128];
    uint32                    nbit_packed;
    tsnc_Status               status;
    tsnc_msg_initialize(&msg, is856_admp_UATIRequest);
    msg.TransactionID = 0;
    status = tsnc_msg_pack
    (
        &msg,            /* Message to be packed. */
        buf,             /* Buffer to pack into. */
        0,               /* Bit offset to start packing. */
        sizeof(buf) * 8, /* Buffer length in bits. */
        &nbit_packed     /* Returns number of bits packed. */
    );
    if(status != TSNC_STATUS_OK)
    {
        /* Report error. */
    }
    tsnc_msg_finalize(&msg);
}
```

The code below gives an example usage in C++:

```
{
    is856_admp_UATIRequest    msg;
    uint8                     buf[128];
    uint32                    nbit_packed;
    tsnc_Status               status;
    msg.TransactionID = 0;
    status = msg.Pack
    (
        buf,             /* Buffer to pack into. */
        0,               /* Bit offset to start packing. */
        sizeof(buf) * 8, /* Buffer length in bits. */
        &nbit_packed     /* Returns number of bits packed. */
    );
    if(status != TSNC_STATUS_OK)
    {
        /* Report error. */
    }
}
```

In one embodiment, a message must be properly created and initialized before it is used, finalized or destroyed. To initialize a message, the runtime library 230 provides tools to allocate memory space for the messages. Initialization of a message involves initializing some internal fields, bit buffers and nested messages. The runtime library 230 offers flexible memory management schemes. The default scheme uses the global memory management functions tsnc_new and tsnc_delete defined in tsnc_custom.h. These two functions can be customized when a user integrates the runtime library onto the user's platform.

The second scheme is to use an allocator object. Each allocator object has two functions: an allocate function and a deallocate function. They are defined and supplied by the user. By associating an allocator object with a message, this scheme gives the user precise control over how memory is managed for the message.

In one embodiment, the source code generated by the TSN.1 compiler 210 is highly portable and virtually independent from the user specific environment. The source code runs on both 32-bit and 64-bit processors. The TSN.1 compiler 210 can run on any of the popular development platforms, including Microsoft Windows, Linux, SUN Solaris, and other Unix systems.

In one embodiment, the TSN.1 compiler 210 generates a highly space efficient code. The object size of the subroutines can be up to 70% smaller than that of the typical handwritten parsers. Furthermore, the generated code is optimized for embedded applications and is fully re-entrant to run on multi-threaded systems.

Figure 5:
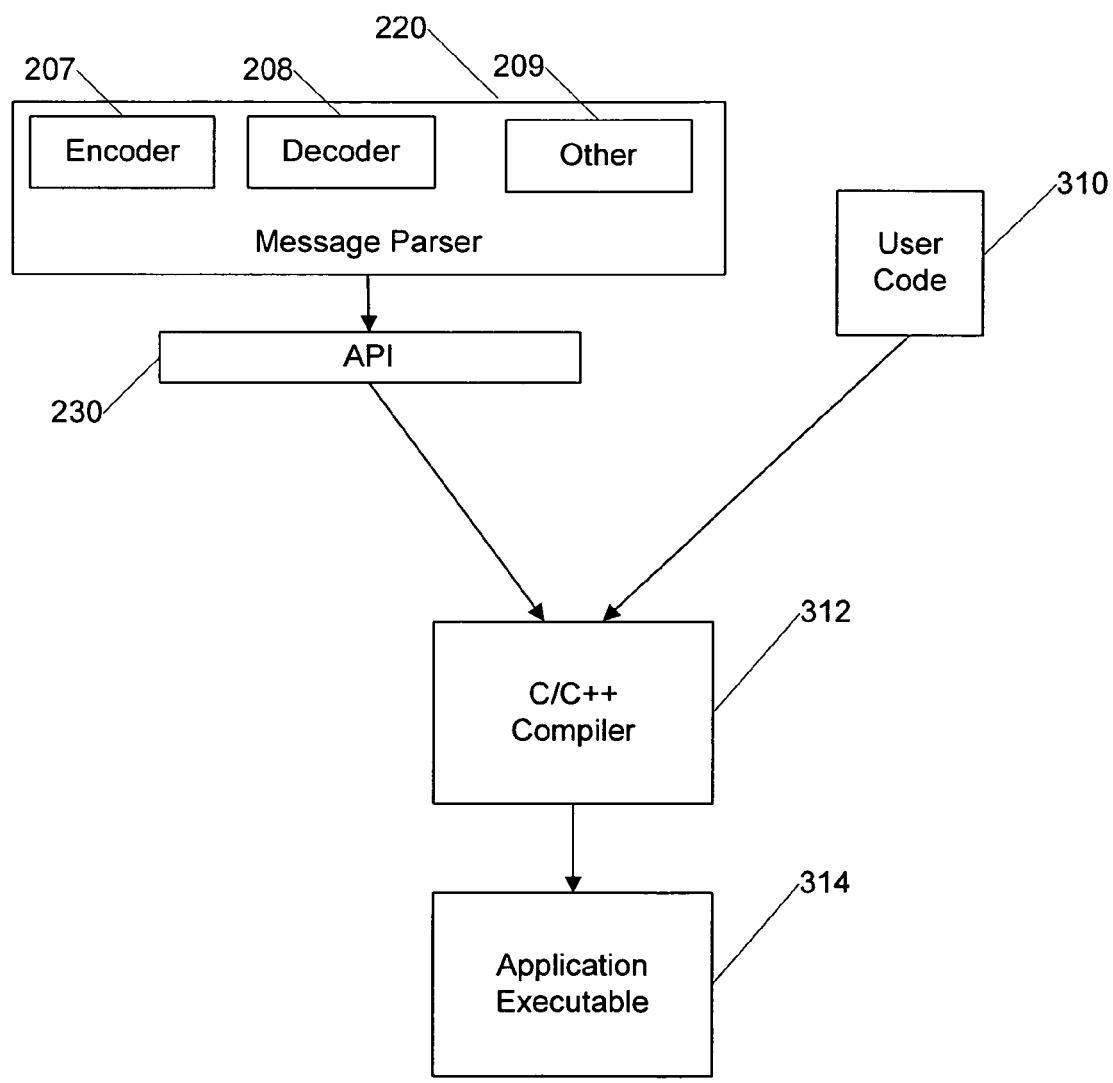
FIG. 5 is a block diagram illustrating an overview of programming using the results of a TSN.1 compiler, and further compiling with high-level application code to generate an executable application according to an embodiment of the present invention.

FIG. 5 is a block diagram illustrating the TSN.1 message parser 220 compiled with a user code 310 according to an embodiment of the present invention. In the illustrated embodiment, the message parser 220 contains message handling subroutines, such as the encoder 207, the decoder 208 and other functions module 209. The message parser 220 can be easily incorporated into a user application. Using a standard target programming language compiler, a user can compile the message parser, with the runtime library and a user code to produce a resulting application executable. Examples of target programming languages include, but are not limited to, C programming language and C++ programming language. Examples of target programming compilers include, but are not limited to, C compiler and C++ compiler.

A user who is developing a message handling application can link the message parser 220 with the user code 310 using the API 230, compile it using a C/C++ compiler 312 and obtain an application executable 314. By defining message in TSN.1 and generating message parser 220 using the TSN.1 Compiler, the user may have about 90% less code to hand-write and maintain. By saving the software development time, the user can faster deliver the application to the market.

Figure 6:
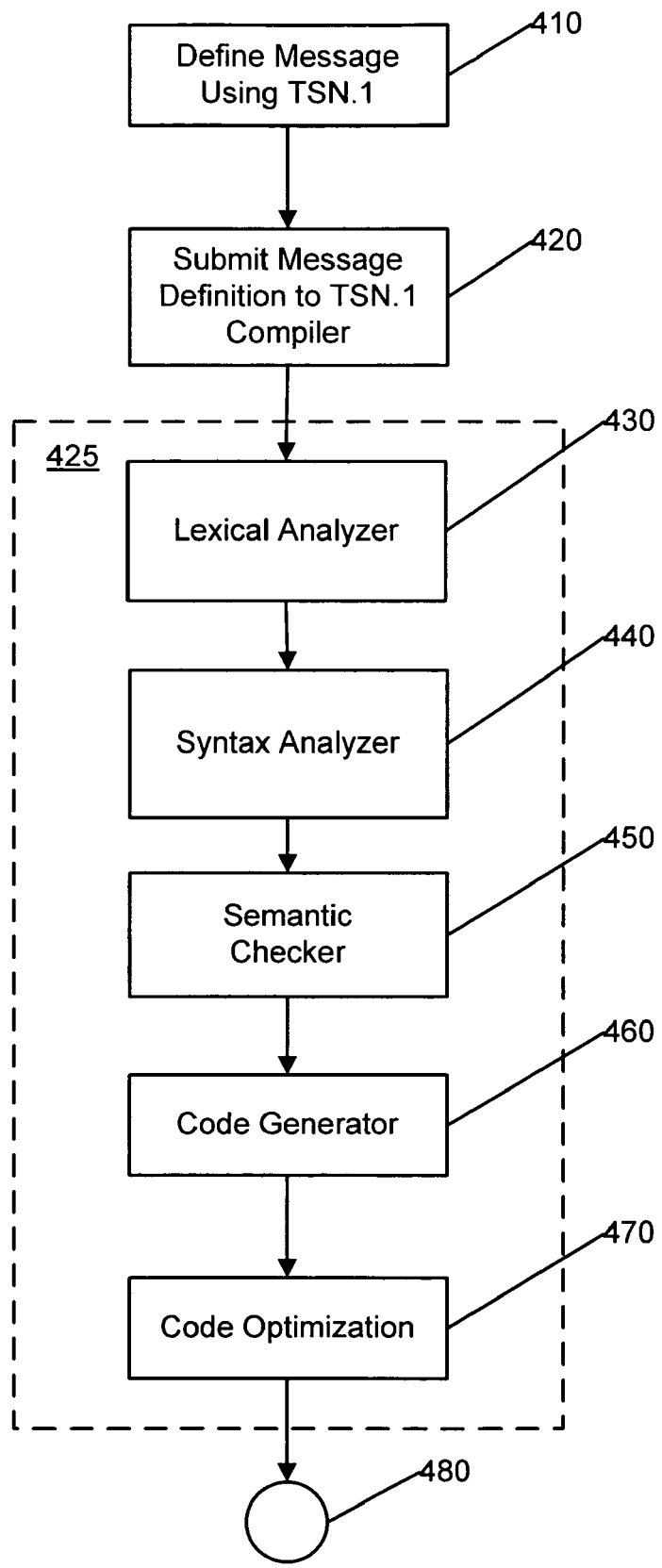
FIG. 6 is a flow chart illustrating the steps performed by a TSN.1 compiler according to an embodiment of the present invention.

FIG. 6 is a flow chart illustrating the steps performed by a TSN.1 compiler according to an embodiment of the present invention. At a step 410, a user defines a message or messages using TSN.1. A message definition starts with an identifier that uniquely identifies the message. The identifier is followed by a formal argument list, the definition operator "::=", and the body of the message. The body contains a sequence of field declarations. In general, each field declaration starts with an identifier followed by the size of the field (in unit of bits). For example, the following definition of the is856_smp_KeepAliveRequest message in the Default Session Management Protocol ("DSMP") declares a single field TransactionID that has 8 bits.

```
is856_smp_KeepAliveRequest( ) ::=
{
    TransactionID 8;
}
```

In one embodiment, the field ordering and bit ordering in a message definition are defined by several rules. For example, the order of fields in the bit sequence should follow the same order as they appear in the message definition from top to bottom. Moreover, the order of bits within a field should be such that the most significant bit should appear first in the bit sequence, followed by the second most significant bit, and so on.

In one embodiment, the size of the bit field can be any valid integer expression. It does not need to be an integer constant, or even a constant expression. If the size of the bit field is an expression, the expression can make reference to a previously defined bit field, as it is in the following example:

```
is856_smp_SessionClose( ) ::=
{
    CloseReason      8;
    MoreInfoLen      8;
```

-continued

```
        MoreInfo              8 * MoreInfoLen;
}
```

In this definition, the size of MoreInfo is the value of field MoreInfoLen multiplied by 8. If MoreInfoLen has a value of 3 in a given instance of an is856_smp_SessionClose message, then MoreInfo will have 24 bits in that instance. By default, the range of values of a bit field is determined by the size of that field. For example, a field with "n" bits has values between 0 and $2^n-1$ inclusive. Thus, in the above example of a declaration, since the MoreInfo is 8, the range for MoreInfoLen in the above declaration is between 0 and 255 (since $2^8-1=255$). To limit this range to something other than the default, an optional interval can be specified following the field declaration.

In one embodiment, fields in a message definition are declared as a single dimensional array. For example, the definition for the Access Parameters Message in the Default Access Channel MAC Protocol, is856_acmp_AccessParameters, can be defined as follows:

```
N_ACMPAPersist ::= 4;
is856_acmp_AccessParameters( ) ::=
{
        AccessCycleDuration               8;
        AccessSignature                  16;
        OpenLoopAdjust                    8;
        ProbeInitialAdjust                5;
        ProbeNumStep                      4;
        PowerStep                         4;
        PreambleLength                    3;
        CapsuleLengthMax                  4;
        Apersistences [N_ACMPAPersist]    6;
}
``` where, Apersistences is declared as an array of 4 elements, and each element of Apersistences has 6 bits. Default values can be specified for bit field arrays by using curly braces and comma separated constants, e.g., {0, 1, 2}. Other features incorporated into message construction include "case of" construct, "if-else" construct, macros, variables and assignment declarations, message aliases, expressions, operators, etc. The message definitions can be saved in a file. Alternatively, a user defines at least one communication managing message having at least one definition of a predetermined protocol. The communication managing message is defined using a protocol-independent notation and is used to create a set of definitions of the predetermined protocol. At a step 420, a user submits message definition file to the TSN.1 Compiler. The user can submit the messages definition files by including the file name in a command line when invoking the TSN.1 compiler.

At a step 425, a user launches the TSN.1 compiler. The step 425 comprises several intermediate steps starting with a step 430.

At the step 430, the TSN.1 compiler performs lexical analysis on the message definition file generating a sequence of tokens. Examples of tokens are keywords, identifiers, separators, etc.

At a step 440, the TSN.1 compiler performs syntax analysis using the tokens generated by 430 as inputs. It makes sure the message definitions are properly structured and conform to the TSN.1 grammar.

At a step 450, the TSN.1 compiler performs semantics analysis. For example, it checks for undeclared symbols, duplicate symbols, invalid field size, etc.

At a step 460, the TSN.1 compiler generates a high-level source code of the message parser. As described in reference to FIG. 3, the message parser comprises a C/C++ header file, a C/C++ source file and the runtime library. For each TSN.1 message definition, the C header file contains C structure typedefs, whereas the C++ header file contains C++ classes.

At a step 470, the TSN.1 compiler performs optimization of the source code of the message parser. For example, optimization may be performed for TSN.1 messages in unit of octets rather than bits. In computing, optimization is the process of modifying a code to improve its efficiency. Although the word "optimization" shares the same root as "optimal," it is rare for the process of optimization to produce a truly optimal code for all purposes. There will always be tradeoffs. Thus, optimization must be approached with caution and must involve application of sound algorithms and working prototypes.

At a step 480, the generated files, the runtime library source, and other user modules can be compiled by a C/C++ compiler to produce a resulting application executable.

Figure 7:
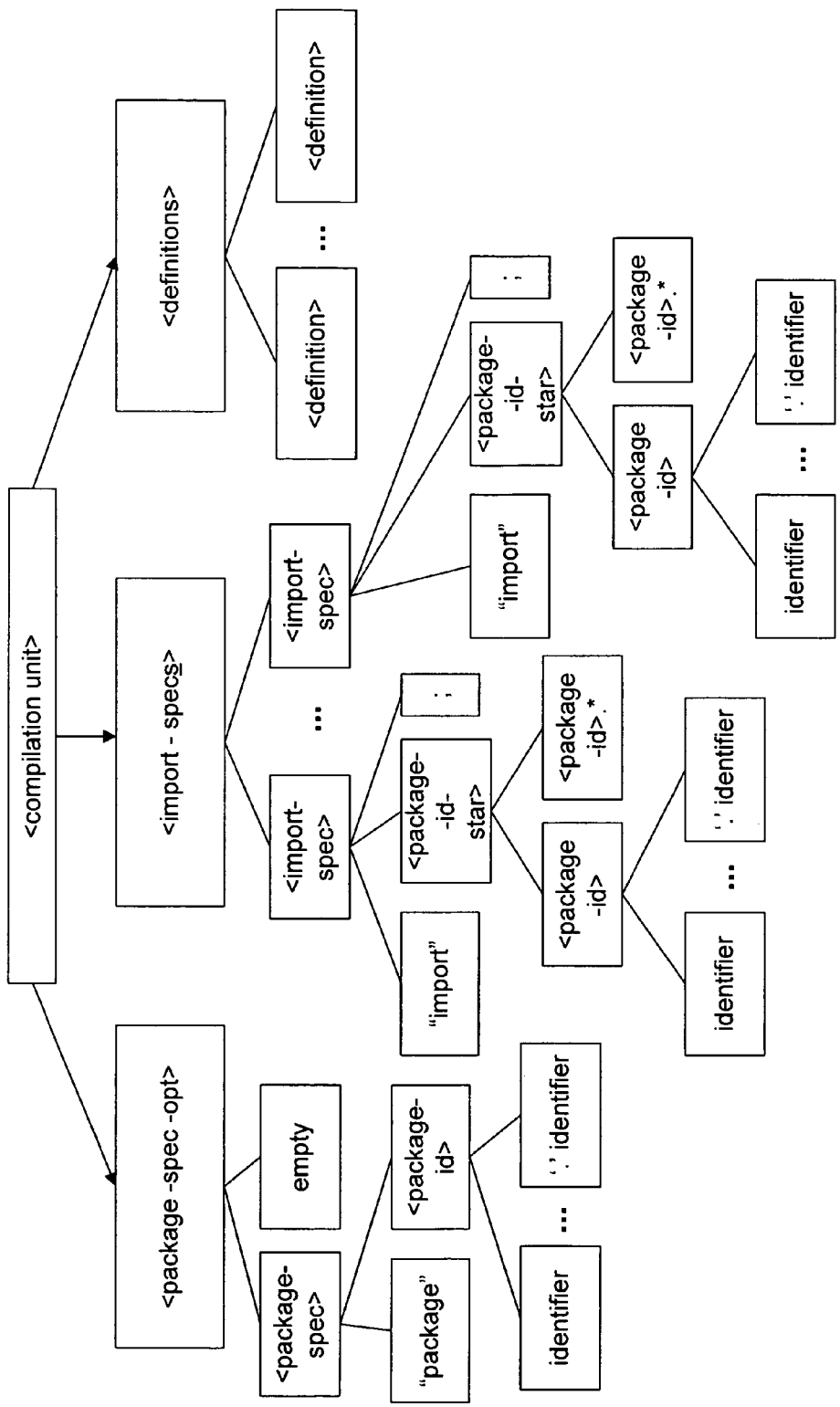
FIG. 7 is a block diagram illustrating a BNF context-free grammar for a TSN.1 compilation unit according to an embodiment of the present invention.

FIG. 7 is a block diagram illustrating in pictorial form a BNF context-free grammar as shown below in TABLE 5 for the TSN.1 compilation unit according to an embodiment of the present invention. The TSN.1 compilation unit is a root node for the TSN.1 Syntax structure.

TSN.1 Syntax

A TSN.1 as provided by embodiments of the present invention is expressed using syntax based on a grammar exemplified in TABLE 5. The grammar shown is specified context-free in Backus-Naur form ("BNF"). A BNF specification is a set of derivation rules written as <symbol>::=<expression with symbols> where <symbol> is a nonterminal, and the expression consists of sequences of symbols and/or sequences separated by the vertical bar, '|', indicating a choice, the whole being a possible substitution for the symbol on the left. Symbols that never appear on a left side are terminals. The TSN.1 Syntax is presented in TABLE 5. Operator precedence is not specified in the example of TABLE 5.

TABLE 5

```
<compilation-unit> ::= <package-spec-opt> <import-specs>
                      <definitions>
<package-spec-opt> ::= <package-spec> | empty
    <package-spec> ::= "package" <package-id> ';'
    <import-specs> ::= <import-specs> <import-spec> | empty
    <import-spec> ::= "import" <package-id-star> ';'
    <package-id-star> ::= <package-id> | <package-id> '.' '*'
    <package-id> ::= identifier | <package-id> '.' identifier
    <definitions> ::= <definitions> <definition> | empty
    <definition> ::= identifier "::=" <expression> ';' |
                     identifier "::=" "enumerated"
                     <enumerated-block> |
                     identifier "::=" "macro" <declaration-block> |
                     identifier <formal-arguments> "::="
                     '{'
                          <variable-decls>
                          <declarations>
                          <optional-decls>
                     '}' |
                     identifier <formal-arguments> "::="
                     identifer ';' |
                     ';'
<enumerated-block> ::= '{' <enum-literals> '}' | '{' '}'
    <enum-literals> ::= <enum-literals> ',' <enum-literal> |
                        <enum-literal>
```

TABLE 5-continued

```
<enum-literal> ::= identifier | identifier '(' <expression> ')'
<formal-arguments> ::= '(' <argument-decls> ')' | '(' ')'
<argument-decls> ::= <argument-decls> ',' <argument-decl> |
                    <argument-decl>
<argument-decl> ::= identifier <expression> | '&' identifier
                    <expression>
<variable-decls> ::= <variable-decls> <variable-decl> | empty
<variable-decl> ::= "var" identifier <expression>
                    <default-value-opt> ';'
<optionals-decls> ::= <optional-decls> <optional-decl> | empty
<optional-decl> ::= "optional" identifier ':' <declaration>
<declarations> ::= <declarations> <declaration> | empty
<declaration> ::= <declaration-block> |
                  <macro-expansion> |
                  <conditional-decl> |
                  <field-decl> |
                  <assignment-decl> |
                  ';'
<declaration-block> ::= '{' <declarations> '}'
<macro-expansion> ::= "expand" identifier
<conditional-decl> ::= "if" '(' <expression> ')' <declaration> |
                      "if" '(' <expression> ')' <declaration>
                      "else" <declaration>
<field-decl> ::= identifier <array-opt> <expression>
                 <interval-opt>::=
                 <default-value-opt> ';' |
                 "reserve" <expression> ';' |
                 <align-expression> ';' |
                 identifier <array-opt> <expression-opt> ':'
                 identifier <actual-args-opt> ';' |
                 identifier <array-opt> <expression-opt> ':'
                 '{'
                     <variable-decls>
                     <declarations>
                     <optional-decls>
                 '}' |
                 identifier <expression-opt> ':'
                 "case" <expression> "of"
                 '{'
                     <case-decls>
                 '}'
<assignment-decl> ::= identifier '=' <expression> ','
<actual-args-opt> ::= '(' <expression-list> ')' | '(' ')' | empty
<case-decls> ::= <case-decls> <case-decl> | empty
<case-decl> ::= <case-labels> "=>" <field-decl> |
                '_' "=>" <field-decl>
<case-labels> ::= <case-labels> ',' <case-label> |
                  <case-label>::=
<case-label> ::= <expression> ".." <expression> |
                 <expression>
<array-opt> ::= '[' <expression-opt> ']' | '[' <interval> ']' |
                empty
<default-value-opt> ::= '=' <expression> |
                       '=' '{' <expression-list> '}' |
                       '=' '{' '}' |
                       empty
<expression-opt> ::= <expression> | empty
<interval-opt> ::= <interval> | empty
<interval> ::= '(' <expression> ".." <expression> ')'
<expression-list> ::= <expression-list> ',' <expression> |
                      <expression>::=
<expression> ::= <expression> '+'       <expression>
<expression> ::= <expression> '-'       <expression>
<expression> ::= <expression> '*'       <expression>
<expression> ::= <expression> '/'       <expression>
<expression> ::= <expression> '%'       <expression>
<expression> ::= <expression> '&&'      <expression>
<expression> ::= <expression> "||"      <expression>
<expression> ::= <expression> "=="      <expression>
<expression> ::= <expression> "!="      <expression>
<expression> ::= <expression> ">="      <expression>
<expression> ::= <expression> "<="      <expression>
<expression> ::= <expression> '>'       <expression>
<expression> ::= <expression> '<'       <expression>
<expression> ::= <expression> "<<"      <expression>
<expression> ::= <expression> ">>"      <expression>
<expression> ::= <expression> '&'       <expression>
<expression> ::= <expression> '|'       <expression>
<expression> ::= <expression> '^'       <expression>
<expression> ::= "true" | "false" | integer | identifier |
                 <align-expression> |
                 '+' <expression> | '-' <expression> |
                 '!' <expression> | '~' <expression> |
                 '(' <expression> ')'
<align-expression> ::= "align" '(' <expression> ',' <expression> ')' |
                       "align" '(' <expression> ')'
```

In the illustrated embodiment, the TSN.1 compilation unit is built by concatenating a package specification option, import specifications and definitions. The package specification option may include package specification. The package specification is built by concatenating a primitive called "package" with a package identifier. The package identifier comprises at least one identifier.

The import specifications may contain an import specification. The import specification is built by concatenating a primitive called "import" with a package identifier star. The package identifier star contains at least one package id. The package id contains at least one identifier. The definitions may contain at least one definition.

Figure 8:
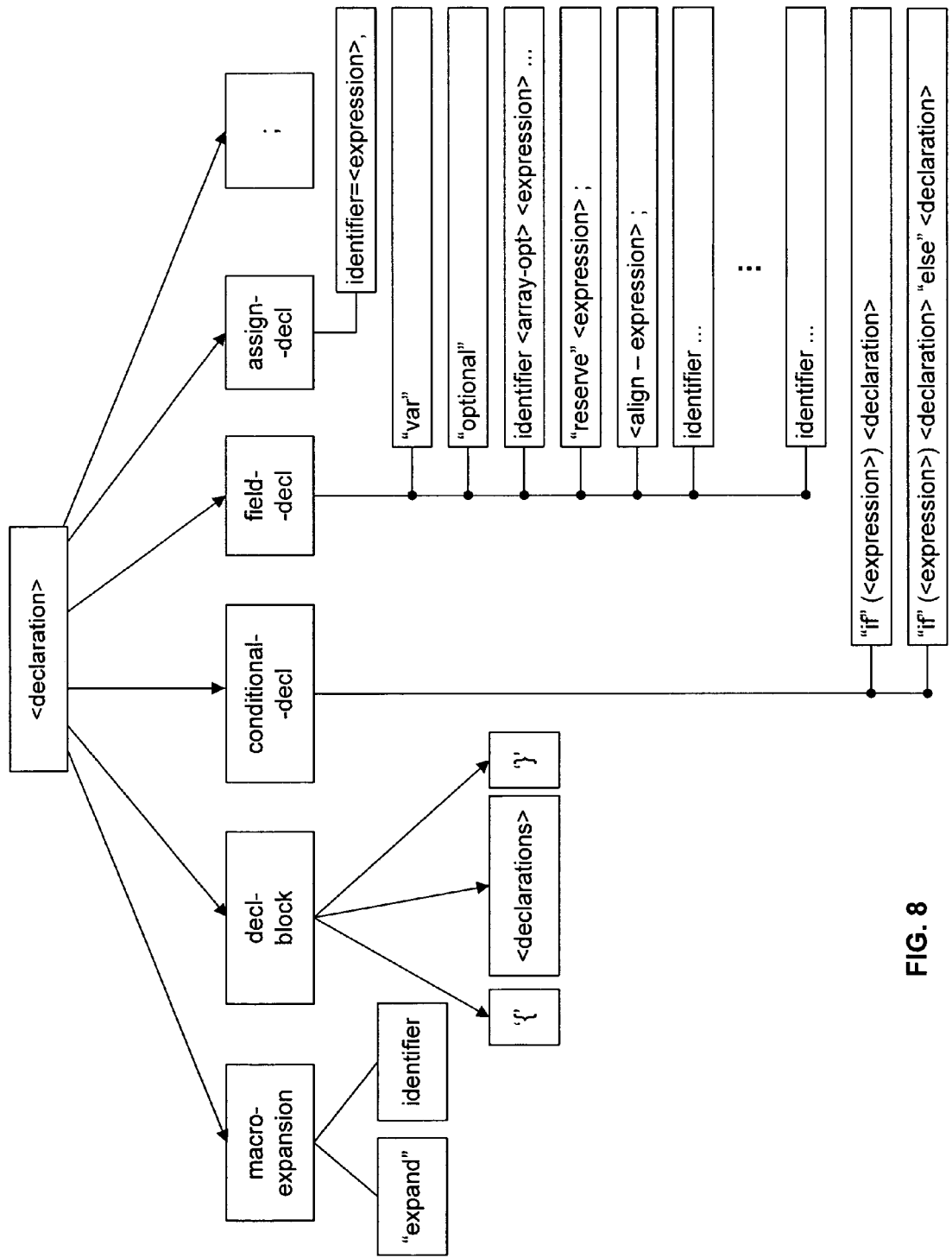
FIG. 8 is a block diagram illustrating the BNF context-free grammar for a TSN.1 declaration according to an embodiment of the present invention.

FIG. 8 is a block diagram illustrating the BNF context-free grammar for the TSN.1 declaration according to an embodiment of the present invention. In the illustrated embodiment, the TSN.1 declaration may contain macro-expansions, declaration blocks, conditional declarations, field declarations and statement declarations. The macro expansion can be built by concatenating a primitive called "expand" with an identifier. The declaration block can be built by concatenating a "{" with a declaration and with a "}". The conditional declaration can contain an "if" statement or an "if-else" statement. The "if" statement is built by concatenating a primitive called "if" with and an expression and a declaration. The "if-else" statement is built by concatenating the primitive "if" with an expression, a declaration, a primitive "else" and a declaration. The field declaration may comprise a primitive "var," a primitive "optional," an identifier concatenated with an array option and an expression, a primitive "reserve" concatenated with an expression, an alignment expression, or an identifier concatenated with an array option or/and an expression option.

Figure 9:
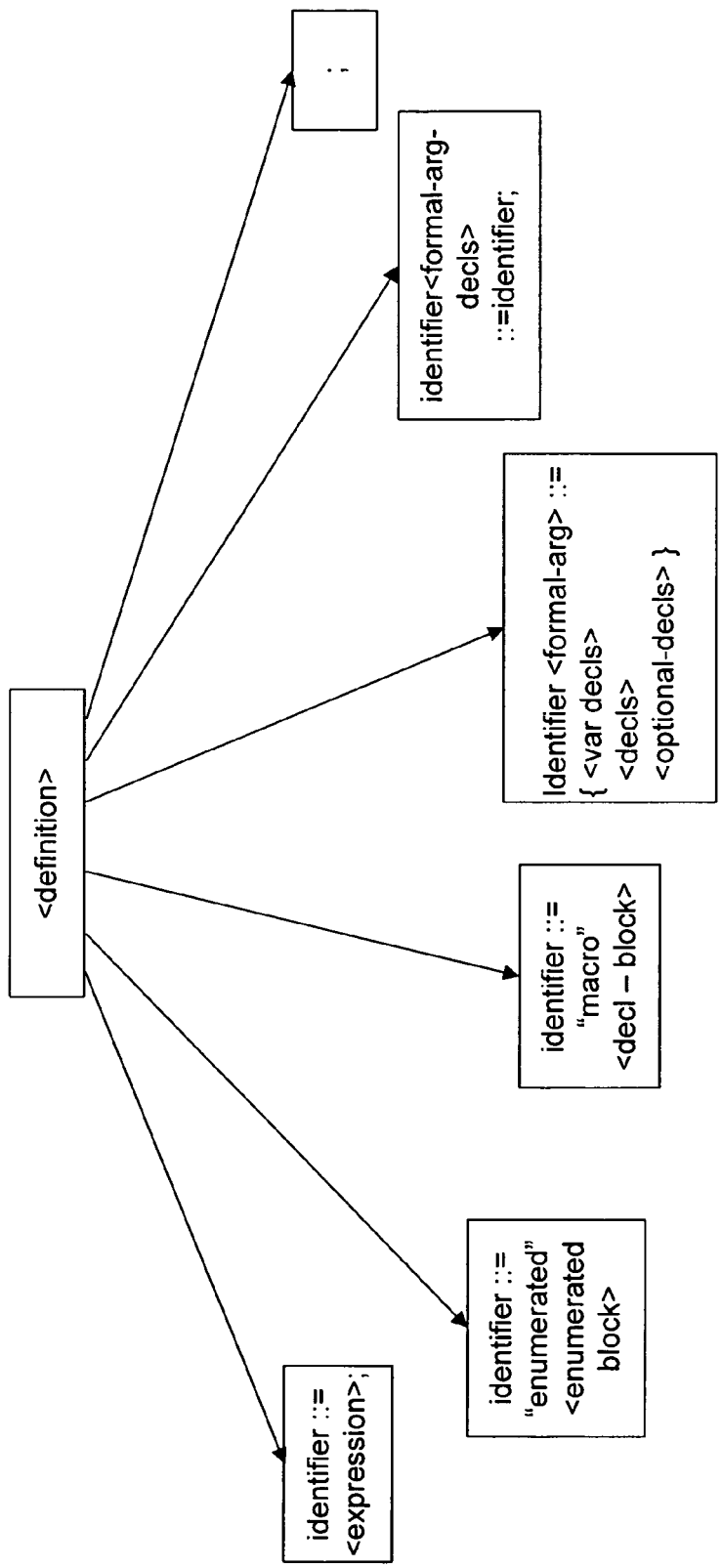
FIG. 9 is a block diagram illustrating the BNF context-free grammar for a TSN.1 definition according to an embodiment of the present invention.

FIG. 9 is a block diagram illustrating the BNF context-free grammar for the TSN.1 definition according to an embodiment of the present invention. In the illustrated embodiment, the TSN.1 definition may comprise an identifier concatenated with an expression, an identifier concatenated with a primitive "enumerated" and an enumeration, an identifier concatenated with a primitive "macro" and a declaration block, an identifier concatenated with a formal argument declaration and a declaration block, or an identifier concatenated with a formal argument declaration and an identifier.

The steps of a method or algorithm or the functions of a module, unit or block described in connection with the embodiments disclosed herein can be embodied directly in hardware, in a software module executed by a processor, or in a combination of the two Furthermore, those of skill in the art will appreciate that the various illustrative logical blocks, modules, units, and method steps described in connection with the above described figures and the embodiments disclosed herein can often be implemented as electronic hardware, computer software, or combinations of both. To clearly illustrate this interchangeability of hardware and software, various illustrative components, blocks, modules, units, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, unit or step is for ease of description. Specific functions or steps can be moved from one module, block or unit to another without departing from the invention.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A method for creating a message parser for encoding and decoding communication managing messages of a predetermined protocol in a target programming language for use in a communication system, the method comprising:
    creating a communication managing messages source file having definitions of communication managing messages of the predetermined protocol, using a protocol-independent notation;
    submitting the communication managing messages source file to a protocol-independent notation compiler;
    performing a lexical analysis of the communication managing messages using the protocol-independent notation compiler to generate a sequence of tokens;
    performing a syntax analysis of the sequence of tokens using the protocol-independent notation compiler to generate message definition structures which conform to the protocol-independent notation;
    performing a semantics analysis of the message definition structures to check for undeclared symbols, duplicate symbols and invalid field size; and
    generating a message parser from the message definition structures, the message parser comprising a message encoder and a message decoder for encoding and decoding communication managing messages, the message parser expressed in a target programming language.

2. The method of claim 1, further comprising generating a runtime library from the message definition structures, the runtime library configured to handle message subroutines and operate with the structures in the target programming language.

3. The method of claim 1, further comprising: optimizing the message parser to improve execution performance of the message parser; and compiling the message parser, with the runtime library and a user code using a target programming language compiler to produce a resulting application executable.

4. The method of claim 1, wherein generating a sequence of tokens comprises selecting tokens from the group of keywords, identifiers and separators.

5. The method of claim 1, wherein expressing a message parser in a target programming language comprises generating a message parser in a C programming language.

6. The method of claim 1, wherein expressing a message parser in a target programming language comprises generating a message parser in a C++ programming language.

7. The method of claim 1, wherein generating a message parser comprises: generating a target programming language header file; and generating a target programming language source file.

8. The method of claim 7, wherein generating a target programming language header file comprises generating target programming structures.

9. The method of claim 7, wherein generating a target programming language header file comprises generating target programming classes.

10. The method of claim 1, wherein creating a communication managing messages source file comprises creating a communication messages source file having communication managing messages with conditions.

11. The method of claim 1, wherein creating a communication managing messages source file comprises creating a communication messages source file having communication managing messages with recursion.

12. A method for creating a message parser for encoding and decoding communication managing messages of a predetermined protocol in a target programming language for use in a communication system, the method comprising:
    defining at least one communication managing message of a predetermined protocol, using a protocol-independent notation to create a set of definitions;
    submitting the set of definitions to a protocol-independent notation compiler;
    performing a lexical analysis of the set of definitions using the protocol-independent notation compiler to generate a sequence of tokens;
    performing a syntax analysis of the sequence of tokens using the protocol-independent notation compiler to generate message definition structures which conform to the protocol-independent notation; and
    performing a semantics analysis of the message definition structures to check for undeclared symbols, duplicate symbols and invalid field size; and
    generating a message parser from the message definition structures, the message parser comprising a message encoder and a message decoder for encoding and decoding communication managing messages, the message parser expressed in a target programming language.

13. The method of claim 12, further comprising generating a runtime library from the message definition structures, the runtime library configured to handle message subroutines and operate with the structures in the target programming language.

14. The method of claim 12, further comprising: optimizing the message parser to improve execution performance of the message parser; and compiling the message parser, with the runtime library and a user code using a target programming language compiler to produce a resulting application executable.

15. The method of claim 12, wherein generating a sequence of tokens comprises selecting tokens from the group of keywords, identifiers and separators.

16. The method of claim 12, wherein expressing a message parser in a target programming language comprises generating a message parser in a C programming language.

17. The method of claim 12, wherein expressing a message parser in a target programming language comprises generating a message parser in a C++ programming language.

18. The method of claim 12, wherein generating a message parser comprises: generating a target programming language header file; and generating a target programming language source file.

19. The method of claim 18, wherein generating a target programming language header file comprises generating target programming structures.

20. The method of claim 18, wherein generating a target programming language header file comprises generating target programming classes.

21. The method of claim 12, wherein defining at least one communication managing message comprises creating a set of definitions of the predetermined protocol, the set having communication managing messages with conditions.

22. The method of claim 12, wherein defining at least one communication managing message comprises creating a set of definitions of the predetermined protocol, the set having communication managing messages with recursion.

23. A compiler stored on a non-transitory memory medium for creating a message parser for encoding and decoding communication managing messages of a predetermined protocol in a target programming language for use in a communication system, the compiler comprising:
 a lexical analyzer module configured to analyze definitions in a protocol independent notation of communication managing messages of a predetermined protocol to generate a sequence of tokens;
 a syntax analyzer module configured to analyze the sequence of tokens and generate message definition structures which are properly structured and conform to the protocol-independent notation;
 a semantics analyzer module configured to analyze the message definition structures to check for undeclared symbols, duplicate symbols and invalid field size; and
 a message parser module configured to encode and decode communication managing messages, the message parser module expressed in a target programming language, wherein the message parser module is generated from the message definition structures, and wherein the message parser comprises a message encoder and a message decoder.

24. The compiler of claim 23, further comprising a runtime library configured to handle message subroutines and operate with the structures in the target programming language.

25. The compiler of claim 23, further comprising an optimizer module configured to optimize the message parser to improve execution performance of the message parser.

26. The compiler of claim 23, wherein the tokens are selected from the group of keywords, identifies and separators.

27. The compiler of claim 23, wherein the target programming language is selected from the group of C programming language and C++ programming language.

28. The compiler of claim 23, wherein the message parser comprises a target programming language header file and a target programming language source file.

29. The compiler of claim 23, wherein the target programming language header file comprises target programming structures.

30. The compiler of claim 23, wherein the target programming language header file comprises target programming classes.

* * * * *